United States Patent Office 3,519,579
Patented July 7, 1970

3,519,579
PROCESS FOR MAKING POLYURETHANE FOAMS WITH POLYSILOXANES HAVING REACTIVE —NCO AND —NCS GROUPS
Bernard Kanner, West Nyack, and Enrico James Pepe, Amawalk, N.Y., assignors to Union Carbide Corporation, New York, N.Y., a corporation of New York
No Drawing. Continuation-in-part of application Ser. No. 422,428, Dec. 30, 1964. This application Mar. 10, 1969, Ser. No. 805,801
Int. Cl. C08g 22/46, 31/24, 31/26
U.S. Cl. 260—2.5                                    6 Claims

ABSTRACT OF THE DISCLOSURE

This invention relates to the use of polysiloxanes having at least one isocyanato or isothiocyanato group as foam stabilizers in the one-shot process for producing polyurethane foams.

RELATED APPLICATION

This application is a continuation-in-part of application Ser. No. 422,428, filed Dec. 30, 1964 now abandoned.

SPECIFICATION

In the manufacture of polyurethane foams, it is necessary to have cells of uniform size to obtain uniform properties, and a foam that does not collapse prior to forming a strong gel or curing. In many instances, the rates of blowing due to the isocyanate and water reaction which liberates $CO_2$ or by the addition of a separate blowing agent, and the rates of chain extension and crosslinking, due to the isocyanate and amine reaction, including crosslinking with polyol and reactions through active hydrogen atoms on generated urea and urethane links, are not coordinated. Hence, if the foaming reaction is too rapid, large irregular cells result, or if the foaming action is completed before the crosslinking reaction has advanced sufficiently to provide a strong resilient product, the foam collapses.

It has heretofore been proposed to avoid the aforesaid difficulties by incorporating into the reaction system a surfactant additive such as a silicone-polyoxyalkylene block copolymer, a trialkoxysilane, or polyorganosiloxane. Perhaps the most often used surfactants for this purpose in flexible polyether-polyurethane foams are the silicone-polyoxyalkylene block copolymers. These silicone additives are used in minor amounts and for metering purposes they are generally diluted with one of the other foam components. If the polyol reactant is used as a diluent, with few exceptions, these silicone block copolymer additives are capable of being only dispersed in the polyol rather than dissolved therein. Hence, separation tends to occur, and the mixture must be continually stirred or thoroughly remixed after storage. On the other hand, the silicone additives are generally soluble in the water-amine stream, but their surfactant effect is noticeably diminished after a few hours storage in this environment. Therefore, this solution must be used shortly after it is prepared. Similarly, the silicone additives can be diluted with the diisocyanate stream, but because of the catalyst residues which are generally present in the silicone additives, premature gelation of the diisocyanate can occur, particularly when the surfactant concentration becomes greater than 5 percent.

Accordingly, it is a primary object of this invention to avoid the difficulties alluded to above, and to provide a method for making polyurethane foam compositions or products having uniform or substantially uniform cells, which do not collapse prior to gelling or curing.

It is another object of this invention to provide polyurethane foam compositions which do not require the separate addition of silicone surfactants but instead utilize organo-functional silicones (which in themselves are self-stabilizing in polyurethane compositions).

Organofunctional silicones useful as stabilizers in the practice of this invention are represented by the general formula (I) 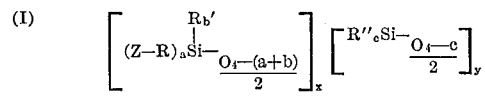

wherein Z is a radical selected from the group consisting of isocyanato, isothiocyanato, mercapto, and carboxyl and bonded to a carbon atom of R; R is a divalent hydrocarbon radical or organic radical containing only hydrogen, carbon, nitrogen, sulfur and oxygen and free of oxygen to oxygen bonds and is bonded to Si through a carbon atom; R' is a radical selected from the group consisting of monovalent hydrocarbyloxy and hydrocarbyl; R" is a member selected from the group consisting of hydrogen and R' as defined above; $a$ is an integer having a value of from 1 to 2 inclusive; $b$ is an integer having a value of from zero to 2 inclusive with the proviso that the value of $(a+b)$ is from 1 to 3 inclusive; $c$ is an integer having a value of from zero to 3 inclusive, and $x$ and $y$ represent the mole percent of the respective units forming the copolymer molecule, the mole percentage values varying from about 0.1 to about 99.9 for each unit.

Illustrative of the divalent hydrocarbon radicals represented by R in Formula I are straight or branched chain alkylene groups such as methylene, ethylene, propylene, n-butylene, isobutylene, n-amylene, decylene, n-octadecylene, 2-ethylhexylene, divalent arylene radicals having a benzenoid nucleus such as p-phenylene, xylylene, ethyl-p-phenylene; fused ring aryl divalent radicals such as naphthalene; bicyclic divalent radicals such as p,p'-biphenylene; cycloalkylene groups such as cyclopentylene and cyclohexylene. Preferably the hydrocarbon R groups contain from 3 to 10 carbon atoms, and more preferably R is a phenylene (—$C_6H_4$—) or a polymethylene chain (—$CH_2$—)$_n$ wherein $n$ has a value of from 2 to 5 inclusive.

Illustrative of the hetero-atom groupings represented by R in Formula I are straight chain and branched chain hydrocarbon groups containing either oxygen linkages and/or hydrocarbyloxy in which the oxygen atom is not bonded directly to silicon, such as

—$CH_2CH_2$—$CH_2OCH_2$—$CH_2$— and

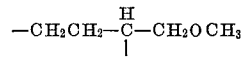

Illustrative of monovalent hydrocarbon radicals represented by R' in Formula I are straight or branched chain alkyl groups such as methyl, ethyl, n-propyl, isopropyl, n-butyl, isoamyl, hexyl, decyl, and octadecyl, the cyclic alkyl groups such as cyclopentyl, cyclohexyl, and bicycloheptyl, the aryl groups such as phenyl, naphthyl; p-phenylphenyl; the aralkyl groups such as phenylethyl, beta-phenylpropyl, neophyl and the alkaryl groups such as tolyl, t-butylphenyl and the like. Preferably R' is an alkyl group containing from 1 to 10 carbons, a phenyl group, i.e., $C_6H_5$—, an alkoxy group such as ethoxy, i.e., —$OC_2H_5$, isopropoxy, n-butoxy or an aryloxy group such as phenoxy, i.e., —$OC_6H_5$—. More preferably R' is methyl, ethoxy, phenoxy or isopropoxy.

Illustrative of the types of compositions represented by Formula I are linear silicone copolymers with a degree of polymerization, i.e. having an average number of recurring units of from 5 to about 200, preferably of from 10 to 50, containing from 1 to about 25 organofunctionalsiloxy units, preferably from 2 to about 10 with the proviso that of all of the above groupings possible for R' and R" the copolymer must contain greater than 50 mole-percent of dimethylsilicone units.

Illustrative of the linear organofunctional siloxanes of Formula I:

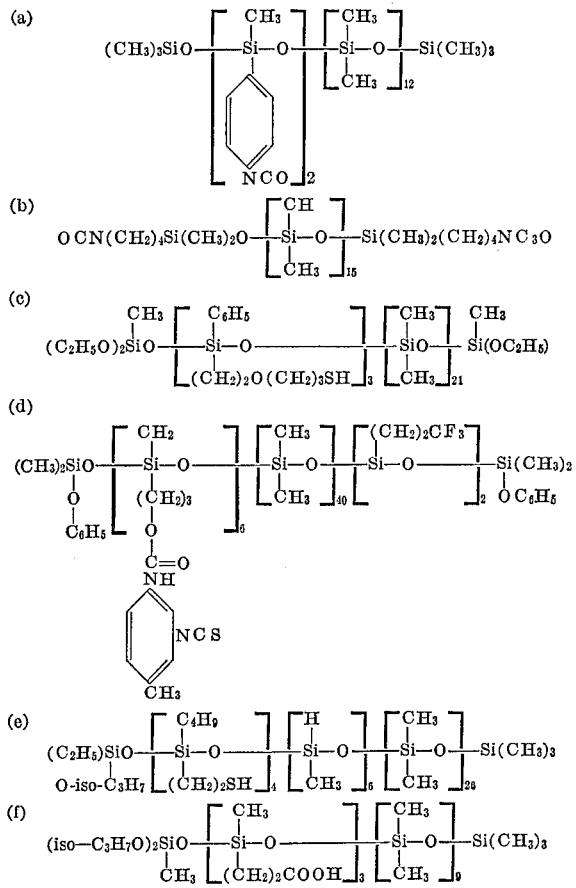

Further illustrative of the types of compositions represented by Formula I are branched copolymers of trifunctional organofunctional silicones with dimethylsilicone and a variety of end-blocking groups. Materials in this class contain a minimum of 50 mole-percent dimethylsilicone. Preferably there should be from 2 to 10 dimethylsilicone units per organofunctionalsilicone unit. More preferably from 3 to 6 should be present. The organofunctionalsilicone unit can be mono-, di- or trifunctional.

Illustrative of the branched organofunctionalsilicone copolymers of Formula I are:

(g) [OCN(CH₂)₃OSiO₃/₂]₂[(CH₃)₂SiO]₉[(CH₃)₃SiO₁/₂]₄

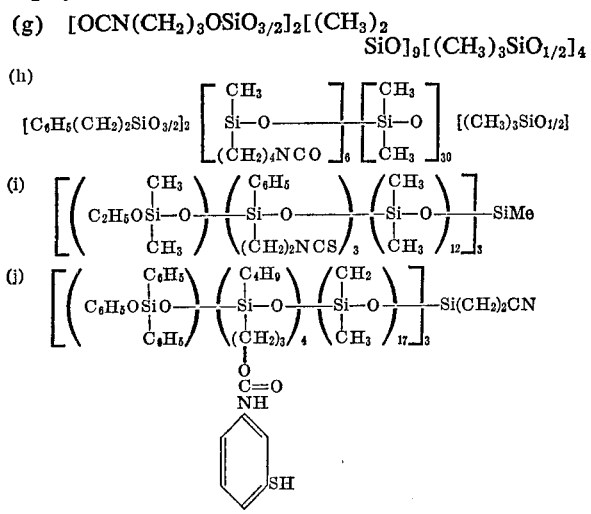

The isocyanato polysiloxanes defined and described above can readily be prepared by reacting the corresponding aminopolysiloxanes with phosgene, advantageously in an inert solvent medium at temperatures of from about 50° C. to about 200° C. Efficient conversion is obtained by using about 3 to 5 times the stoichiometric requirement of phosgene, one molecule of which converts one —NH₂ group to one —N=C=O group. The process is described in detail in copending application Ser. No. 307,003 filed Sept. 6, 1963, and specific exemplification is provided in Example 1 hereinafter. The corresponding aminoalkylsilicone copolymers from which the isocyanato polysiloxanes are prepared are well known in the art and can be conveniently prepared by the method set forth in U.S. Pat. 2,947,771 issued Aug. 2, 1960 to Donald L. Bailey. This method in general comprises heating in the presence of an alkali metal equilibration catalyst a mixture of (1) cyclic dimethylsiloxanes, relatively low molecular weight trimethyl end-blocked dimethylpolysiloxanes, or relatively low molecular weight alkoxy-containing or alkoxy end-blocked dimethylpolysiloxanes, or mixtures thereof, with (2) cyclic aminoalkylarylsiloxanes, or the hydrolyzates of aminoalkylalkyldialkoxysilanes and of aminoalkaryldialkoxysilanes, and aminoalkyldialkylalkoxysilanes. Aminoarylsilicone copolymers suitably employed as precursors of the isocyanato silicones for the practice of this invention can conveniently be prepared by the hydrogenation and reduction of corresponding nitroarylsilicone compounds in accordance with the method disclosed in U.S. Pat. No. 2,998,406 issued Aug. 20, 1961 to Donald L. Bailey et al.

In an analogous manner, the isothiocyanatopolysiloxanes useful in this invention can be prepared by reacting the above described aminopolysiloxanes with thiophosgene.

Mercaptoorganofunctional polysiloxanes hereinbefore described can readily be prepared by the techniques described in copending application Ser. No. 342,534 filed Feb. 4, 1964 and in copending application Ser. No. 352,542 filed Feb. 4, 1964.

Polyurethane foamed products containing siloxanes of this invention as foam stabilizers can be produced by known processes. One process is a one-shot technique wherein all of the reactants are reacted simultaneously with the foaming operation. The second type of general process is the prepolymer process. In this latter method a prepolymer is formed by completing the reaction between the polyether and the isocyanate. The prepolymer can later be foamed by reaction with water or inert blowing agent. Also, the quasi-prepolymer technique can be used to produce foams. In this technique, the isocyanate is first reacted with a portion of the polyether to give a product having a high percentage of free —NCO groups (e.g. from 20 to 50 percent), and this product is subsequently foamed by reaction with polyol and foaming agent.

The above-described processes are well known and are generally suitable for use with foam formulations containing the organofunctional silicone-dimethylsilicone copolymers described in this invention as foam stabilizers.

Thus, the foam formulations of this invention contain (1) a polyether (or mixture of polyethers) containing at least two active hydrogen atoms, (2) an organic isocyanate (or mixture of organic isocyanates) containing at least two isocyanate groups, (3) a catalyst (or mixture of catalyst), (4) a blowing agent, and (5) a siloxane of this invention. The polyethers used in these formulations are also known as "polyols." It is often convenient to provide mixtures of a siloxane of the invention and one or more, but not all, of the other components of the above-mentioned foam formulations. Such mixtures can be blended with the remaining components just prior to use in producing a foam. Such mixtures can be stored indefinitely without significant deterioration or reaction occurring due to the hydrolytic stability of the siloxanes. Suitable mixtures include siloxane-polyether mixtures; siloxane organic isocyanate mixtures; siloxane-catalyst mixtures; and siloxane-polyether-catalyst mixtures.

The active hydrogen-containing polyethers in the foam formulations of this invention include the linear and branched chain polyethers which have a plurality of acyclic ether oxygens and contain at least two hydroxyl radicals. Such hydroxyl groups are preferably alcoholic hydroxyl groups (as distinguished, for example, from the hydroxyl groups in carboxy groups, —COOH) and are most preferably attached to aliphatic carbon atoms (i.e. carbon atoms not in an aromatic ring). The polyethers have molecular weights, based on their hydroxyl values, ranging from 50 to 7500. Illustrative polyethers include the polyoxyalkylene polyols containing one or more chains of connected oxyalkylene radicals which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the polyoxybutylene glycols and copolymers such as polyoxyethylene oxybutylene glycols and polyoxypropyleneoxybutylene glycols. Included in the term "polyoxybutylene glycols" are polymers of 1,2-butylene oxide, 2,3-butylene oxide and 1,4-butylene oxide.

Other acyclic and alicyclic polyols which can be reacted with ethylene oxide, propylene oxide, butylene oxide or mixtures thereof to provide polyethers that are useful in the foam formulation of this invention include glycerol, trimethylolpropane, 1,2,6-hexanetriol, pentaerythritol, sorbitol, glycosides, such as methyl, ethyl, propyl, butyl, and 2-ethylhexyl arabinoside, xyloside, fructoside, glucoside, and rhammoside, polyethers prepared by the reaction of alkylene oxides with sucrose, for example:

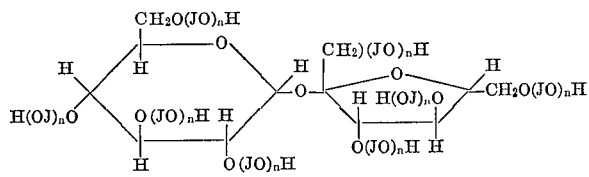

wherein J is an ethylene, propylene or butylene radical, or mixtures thereof and $n$ is an integer such that the average molecular weight of the polyether is 250 and higher.

Further polyethers that are useful in the foam formulation of this invention are prepared by reacting a 1,2-alkylene oxide such as ethylene oxide, propylene oxide, butylene oxide or mixtures thereof with mononuclear polyhydroxybenzenes such as resorcinol, pyrogallol, phloroglucinol, hydroquinone, 4,6-di-t.-butylcatechol, catechol, orcinol, methylphloroglucinol, 2,5,6-trimethylresorcinol, 4-ethyl-5,6-dimethylresorcinol, n-hexylresorcinol and 4-chloro-5-methylresorcinol; polyethers prepared by reacting 1,2-alkylene oxides or mixtures thereof with fused ring systems such as 3-hydroxy-2-naphthol, 6,7-dihydroxy-1-naphthol, 2-hydroxy-1-naphthol, 2,5-dihydroxy-1-naphthol, 9,10-dihydroxyanthracene, and 2,3-dihydroxypenanthrene.

Other polyethers which can be employed in the foam formulations of this invention are those obtained by reacting 1,2-alkylene oxides or mixtures thereof with polynuclear hydroxybenzenes such as the various di-, tri-, and tetraphenylol compounds in which two to four hydroxybenzene groups are attached by means of single bonds or by an aliphatic hydrocarbon radical containing one to twelve carbon atoms. The term "polynuclear" as distinguished from "mononuclear" is used to designate at least two benzene nuclei in a compound. Exemplary diphenylol compounds include 2,2-bis(p-hydroxyphenyl)propane; bis(p-hydroxyphenyl)methane, and the various diphenols and diphenylol methanes disclosed in U.S. Pats. Nos. 2,506,486 and 2,744,882, respectively. Exemplary triphenylol compounds which can be employed include the alpha,alpha,omega-tris(hydroxyphenyl)alkanes such as 1,1,3-tris(hydroxyphenyl)ethanes;
1,1,3-tris(hydroxyphenyl)propanes;
1,1,3-tris(hydroxy-3-methylphenyl)propanes;
1,1,3-tris(dihydroxy-3-methylphenyl)propanes;
1,1,3-tris(hydroxy-2,4-dimethylphenyl)propanes;
1,1,3-tris(hydroxy-2,5-dimethylphenyl)propanes;
1,1,3-tris(hydroxy-2,6-dimethylphenyl)propanes;
1,1,4-tris(hydroxyphenyl)butanes;
1,1,4-tris(hydroxyphenyl)-2-ethylbutanes;
1,1,4-tris(dihydroxyphenyl)butanes;
1,1,5-tris(hydroxyphenyl)-3-methylpentanes;
1,1,8-tris(hydroxyphenyl)octanes, and
1,1,10-tris(hydroxyphenyl)decanes.

Tetraphenylol compounds which can be reacted with 1,2-alkylene oxides to produce polyethers that are useful in the foam formulations of this invention include the alpha,alpha,omega,omega-tetrakis(hydroxyphenyl)alkanes such as 1,1,2,2-tetrakis(hydroxyphenyl)ethanes;
1,1,3,3-tetrakis(hydroxy-3-methypheneyl)propanes;
1,1,3,3-tetrakis(dihydroxy-3-methylphenyl)propanes;
1,1,4,4-tetrakis(hydroxyphenyl)butanes;
1,1,4,4-tetrakis(hydroxyphenyl)-2-ethylbutanes;
1,1,5,5-tetrakis(hydroxyphenyl)pentanes;
1,1,5,5-tetrakis(hydroxyphenyl)-3-methylpentanes;
1,1,5,5-tetrakis(dihydroxyphenyl)pentanes;
1,1,8,8-tetrakis(hydroxy-3-butylphenyl)octanes;
1,1,8,8-tetrakis(dihydroxy-3-butylphenyl)octanes;
1,1,8,8-tetrakis(hydroxy-2,5-dimethylphenyl)octanes;
1,1,10,10-tetrakis(hydroxyphenyl)decanes;

and the corresponding compounds which contain substituent groups in the hydrocarbon chain such as 1,1,6,6-tetrakis(hydroxyphenyl)-2-hydroxyhexanes;
1,1,6,6-tetrakis(hydroxypheneyl)-2-hydroxy-5-methylhexanes, and
1,1,7,7-tetrakis(hydroxyphenyl)-3-hydroxyheptanes.

Other particularly useful polyethers which can be employed in the foam formulations of this invention are the ethylene oxide, propylene oxide, and butylene oxide adducts of phenol-formaldehyde condensation product materials such as the novolaks. Novolaks are mixtures of polynuclear compounds of the diphenylmethane type of structure such as 4,4′-dihydroxydiphenylmethane and 2,4′-dihydroxydiphenylmethane. Such compounds are free from methylol groups and are formed by the Baeyer reaction of phenol and formaldehyde. In a typical synthesis, novolaks are prepared by condensing one mole of phenolic compound, such as phenol or cresol, with 0.8 mole of an aldehyde, such as formaldehyde or furfural, under acid conditions at a temperature around 160° C. to 170° C. The polynuclear products frequently contain four to eight units and can contain twelve or more units. Novolaks, as such, are non-curable, thermoplastic resins.

Polyethers suitable for use in the foam formulations of this invention are prepared by reacting one or more of the alkylene oxides above noted with acyclic polyamines such as ethylenediamine, propylenediamine, butylenediamine, pentylenediamine, hexylenediamine, octylenediamine, nonylenediamine, decylenediamine; polyalkylene polyamines such as diethylenetriamine, triethylenetriamine, tetraethylenepentamine, and dipropylenetriamine. A particularly suitable polyether is the propylene oxide addition product of diethylenetriamine represented by the formula:

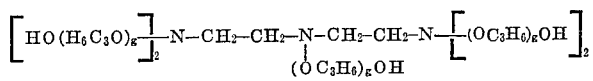

wherein $g$ represents an integer which provides an average molecular weight of 250.

Other suitable polyethers useful in the foam formulations of this invention include the 1,2-alkylene oxide derivatives of mononuclear primary amines such as O-, m-, and p-phenylenediamine; 2,4- and 2,6-diaminotoluene; 2,6-diamino-p-xylene; 4,6-diamine-m-xylene; 2,4-diamino-m-xylene; 3,5-diamino-o-xylene; isohexyl-p-phenylenediamino; 3,5-diaminotoluene, and the like; polynuclear and fused aromatic polyamines such as 1,4-naphthylenediamine; 1,5-naphthylenediamine, 1,8-naphthylenediamine; benzidine, toluidine; 4,4'-methylenedianiline; 3,3'-dimethoxy-4,4'-biphenyldiamine; 3,3'-dichloro-4,4'-biphenyldiamine; 3,3'-dimethyl-4,4'-biphenyldiamine; 4,4'-ethylenedianiline; 4,4'-ethylidenedianiline; 1-fluorenamine; 2,5-fluorendiamine; 2,7-fluorendiamine; 1,4-anthradiamine; 3,3'-biphenyldiamine; 3,4-biphenyldiamine; 9,10-diaminophenanthrene, and 4,4'-diamino-azobenzene.

Higher functional mono- and polynuclear polyamines which also can be reacted with 1,2-alkylene oxides to provide polyethers suitable for use in the foam formulations of this invention include 2,4,6-triaminotoluene; 2,3,5-triaminotoluene; 5,6 - diaminoacenaphthene, 4,4',4''-methylidynetrianiline; 3,5-diaminobenzoic acid, triaminodiphenyl ethers and sulfides such as 2,4,4'-triaminodiphenyl ether; 2,3',4-triamino-4'-methyldiphenyl ether; 2,3',4-triamino-4'-methoxydiphenyl ether; and polyamines obtained by interaction of aromatic monoamines with formaldehyde or other aldehydes, for example:

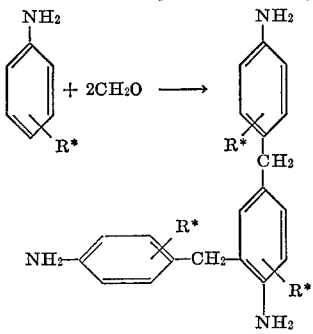

wherein R* is hydrogen or an alkyl group.

In addition to the hydroxyl-containing polyethers described above, many other classes of compounds containing active hydrogen atoms can react with organic isocyanates to produce urethane resin foams. Examples of other operable active hydrogen-containing compounds are hydroxyl-containing polyesters, polyamines, and polyamines. The siloxanes of this invention are also foam stabilizers for urethane foam formulations containing such polyesters, polyamides, and polyamines.

The molecular weight of the polyethers used should range from 250 to 7500 depending upon the characteristics desired in the foamed urethane product. As a general guide, cellular urethane foams of maximum rigidity are prepared by the use of polyethers having a molecular weight range of 250 to 1500; for semi-rigid foams the molecular weight of the polyether should be 800 to 1800; and for flexible open-cell foams the polyether should be of increased chain length and have a molecular weight of 1800 to 5000.

A variety of organic isocyanates can be employed in the foam formulations of this invention for reaction with the polyethers above described to provide urethane foams. Preferred isocyanates are polyisocyanates and polyisothiocyanates of the general formula:

$$Q(NCY)_i$$

wherein Y is oxygen or sulfur, $i$ is an integer of two or more and Q is an alkylene, substituted alkylene, arylene or substituted arylene radical, a hydrocarbon, or substituted hydrocarbon radical containing one or more aryl —NCY bonds and one or more alkyl —NCY bonds. Q can also include radicals such as —QZQ— where Z can be a divalent moiety such as —O—, —O—Q—O—, —CO—, —CO$_2$—, —S—, —S—Q—S—, and —SO$_2$—. Examples of such compounds include hexamethylene diisocyanate, 1,8-disocyanato, p-methane, xylene diisocyanate, (OCNCH$_2$CH$_2$CH$_2$OCH$_2$)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate, xylene-alpha,alpha'-diisothiocyanate, and isopropylbenzene-alpha-4-diisocyanate.

Further included among the isocyanates useful in the foam formulations of this invention are dimers and trimers of isocyanates and diisocyanates and polymeric diisocyanates of the general formulas:

$$Q(NCY)_i \text{ and } [Q(NCY)_i]_j$$

in which $i$ and $j$ are integers of two or more, as well as compounds of the general formula:

$$L(NCY)_i$$

in which $i$ is one or more and L is a monofunctional or polyfunctional atom or radical. Examples of this type include ethylphosphonic diisocyanate, C$_2$H$_5$P(O)(NCO)$_2$; phenylphosphonic diisocyanate, C$_6$H$_5$P(O)(NCO)$_2$; compounds containing a ≡Si—NCY group, isocyanates derived from sulfonamide (QSO$_2$NCO), cyanic acid, thiocyanic acid, and compounds contaning a metal —NCY radical such as tributyltin isocyanate.

The amount of isocyanate employed in the foam formulation of this invention will depend upon the density of the urethane foam and the amount of cross-linking desired. In general, the total —NCO equivalent to total active hydrogen equivalent of the polyether should be such as to provide a ratio of 0.8 to 1.2 equivalents of —NCO per equivalent of active hydrogen, and preferably a ratio of 1.0 to 1.1 equivalents.

The foaming of the foam formulations of this invention is effected by methylene chloride, by water, by liquefied fluorocarbon gases which have boiling points below 80° F. and above —60° F., or by other inert gases such as nitrogen, carbon dioxide, methane, helium, and argon. The liquefied gases are saturated aliphatic fluorohydrocarbons which vaporize at or below the temperature of the foaming mass. Such gases are at least partially fluorinated and can also be otherwise halogenated.

Fluorocarbon blowing agents suitable for use in foaming the formulations of this invention include trichloromonofluoromethane; dichlorodifluoromethane; dichlorofluoromethane; 1,1-dichloro-1-fluoroethane; 1-chloro-1,1-difluoro, 2,2-dichloroethane; and 1,1,1-trifluoro, 2-chloro-2-fluoro, 3,3-difluoro-4,4,4-trifluorobutane. The amount of blowing agent used will vary with density desired in the foaming product. In general, it may be stated that for 100 grams of resin mix containing an average NCO/OH ratio of 1 to 1, 0.005 to 0.3 mole of gas is used to provide densities ranging from 30 to 1 pounds per cubic foot. If desired, water can be used in conjunction with the inert gas or fluorocarbon blowing agent, or water can be used as the only blowing agent.

Catalysts that are suitable for accelerating the polyether-isocyanate reaction in the foam formulations of this invention include amines and a wide variety of metal compounds, both inorganic metal compounds and metal compounds which contain organic groups. Particularly useful catalysts are tertiary amines and organo-tin compounds. All of the above catalysts can be used alone or in mixtures with one or more of the other such catalysts.

Among the organo-tin compounds suitable for use in the foam formulations of this invention that deserve particular mention are stannous acylates such as stannous acetate, stannous octoate, stannous laurate, and stannous oleate; stannous alkoxides such as stannous butoxide, stannous 2-ethylhexoxide and stannous phenoxide, o-, m-, and p-stannous cresoxides; dialkyl tin salts of carboxylic acids, e.g., dibutyltin diacetate, dibutyltin dilaurate, dibutyltin maleate, dilauryltin diacetate, and dioctyltin diacetate. Similarly, there can be used a trialyltin hydroxide, dialkyltin oxide, or dialykltin chloride. Examples of these compounds include trimethyltin hydroxide, tributyltin hydroxide, trioctyltin hydroxide, dibutyltin oxide, dioctyltin oxide, dilauryltin oxide, dibutyltin dichloride, and dioctyltin dichloride.

The tertiary amines which are useful as catalysts in the foam formulations of this invention include tertiary amines substantially unreactive with isocyanate groups and tertiary amines containing active hydrogen atoms reactive with isocyanate groups. Typical tertiary amines which are substantially unreactive with isocyanate groups include triethylamine, tributylamine, trioctylamine, N-methylmorpholine, N-ethylmorpholine, N-octadecylmorpholine, (N - cocomorpholine), N,N,N′,N′ - tetramethylethylenediamine, N,N,N′,N′-tetramethyl-1,3-propanediamine, triethylenediamine (1,4-diazabicyclo[2,2,2]octane), triethylenetetramine, N,N-dimethylbenzylamine, N,N-dimethylcyclohexylamine, benzyltriethylammonium bromide, bis(N,N-diethylaminoethyl) adipate, N,N-diethylbenzylamine, N-ethylhexamethyleneamine, N-ethylpiperidine, alpha-methylbenezyldimethylamine, dimethylhexadecylamine, 3-methylisoquinoline, dimethylacetylamine, and isocyanates and metal compounds containing tertiary nitrogen atoms.

Typical tertiary amines containing active hydrogen atoms reactive with isocyanate groups suitable for use in the foam formulations of this invention include dimethylethanolamine, triethanolamine, triisopropanolamine, N-methyldiethanolamine, N-ethyldiethanolamine, polyoxyalkylene polyol polymers and copolymers of alkylene oxides, such as propylene oxide, ethylene oxide, homopolymers, copolymers, and mixtures thereof started with triethanolamine, triisopropanolamine, ethylenediamine, ethanolamine, and diethylenetriamine. Still other tertiary amines containing active hydrogen atoms reactive with isocyanate groups include polyesters based on polyols such as illustrated above including triethanolamine, triisopropanolamine, and N-alkyl diethanolamines, as well as polycarboxylic acids containing tertiary nitrogen atoms.

Other catalysts suitable for use in the form formulations of this invention include metal organic compounds of lead, arsenic, antimony, and bismuth compounds characterized by the presence therein of a direct carbon-to-metal bond; organic halides of titanium; the inorganic halides of tetravalent tin, arsenic, antimony, bismuth and titanium; polystannates; tin, titanium and copper chelates; and mercury salts. Representative members of this class of catalysts are stannic chloride, stannic bromide, stannic iodine, stannic fluoride, isopropoxysteoroxy polystannate, hydroxysteoroxy polystannate, tin chelates such as bis(acetylacetone)tin dichloride, arsenic trichloride, antimony trichloride, antimony pentachloride, antimony trihexadecylamine, 3-methylisoquinoline, dimethylacetylamine, and isocyanates and metal compounds containing tertiary nitrogen atoms.

Typical tertiary amines containing active hydrogen atoms reactive with isocyanate groups suitable for use in the foam formulations of this invention include dimethylethanolamine, triethanolamine, triisopropanolamine, N-methyldiethanolamine, N-ethyldiethanolamine, polyoxyalkylene polyol polymers and copolymers of alkylene oxides, such as propylene oxide, ethylene oxide, homopolymers, copolymers and mixtures thereof started with triethanolamine, triisopropanolamine, ethylenediamine, ethanolamine, and diethylenetriamine. Still other tertiary amines containing active hydrogen atoms reactive with isocyanate groups include polyesters based on polyols such as illustrated above including triethanolamine, triisopropanolamine, and N-alkyl diethanolamines, as well as polycarboxylic acids containing tertiary nitrogen atoms.

Other catalysts suitable for use in the foam formulations of this invention include metal organic compounds of lead, arsenic, antimony, and bismuth compounds characterized by the presence therein of a direct carbon-to-metal bond; organic halides of titanium; the inorganic halides of tetravalent tin, arsenic, antimony, bismuth, and titanium; polystannates; tin, titanium and copper chelates; and mercury salts. Representative members of this class of catalysts are stannic chloride, stannic bromide, stannic iodide, stannic fluoride, issopropoxysteoroxy polystannate, hydroxysteoroxy polystannate, tin chelates such as bis(acetylacetone) tin dichloride, arsenic trichloride, antimony trichloride, antimony pentachloride, antimony tributoxide, bismuth trichloride, titanium tetrachloride, bis(cyclopentadienyl)-titanium difluoride, titanium chelates such as octylene glycol titanate, dioctyl lead dichloride, dioctyl lead diacetate, dioctyl lead oxide, trioctyl lead chloride, trioctyl lead hydroxide, trioctyl lead acetate, copper chelates such as copper acetylacetonate, mercurous chloride, mercuric acetate, tributyl arsine, triphenyl stibine, trioctylbismuthine, octylarsine, phenyldimercaptoarsine, butyldichlorobismuthine, triphenylstibine iodine cyanide, isoamylarsenic disulfide, triethylstibene oxide, octylarsenic acid, dibutylstibinic acid, phenylarsenic dilaurate, butylbismuth dibenzenesulfonamide, arsenopropane, and bis(dibutylbismuth)oxide.

Still other catalysts suitable for use in the foam formulations of this invention include tertiary phosphines (such as trialkylphosphines and dialkylbenzylphosphines), strong bases (such as the alkali and alkaline earth metal hydroxide, alkoxides and phenoxides), chelates of various metals (such as those which can be otained from acetylacetone, benzoylacetone, trifluoroacetylacetone, ethyl acetoacetate, salicylaldehyde, cyclopentanone-2 - carboxylate, acetylacetoneimine, bis - acetylacetonealkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions such as $MoO_{2++}$, $UO_{2++}$, and the like); alcoholates and phenolates of various metals (such as $TI(OR^3)_4$, $Sn(OR^3)_4$, $Sn(OR^3)_2$, $Al(OR^3)_3$, and the like, wherein $R^3$ is alkyl or aryl), and the reaction products of alcoholates with carboxylic acids, beta-diketones, and 2-(N,N-dialkylamino)-alkanols (such as the well known chelates of titanium obtained by said or equivalent procedures) salts of organic acids with a variety of metals (such as alkali metals, alkaline earth metals, Al, Sn, Pb, Sb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like); and other tin compounds (such as dibutyltin-bis(4-methylamino-benzoate), dibutyltin - bis(6 - methylaminocaproate), dialkyltin dialkoxide, dialkyltin dichloride, trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like).

In addition to the above described polyethers, siloxanes, polyisocyanates, catalysts and blowing agents, the polyurethane foam compositions of this invention may contain, if desired, other components such as:

(a) diol foaming modifiers, such as ethylene glycol, polyethylene glycol, and the like;
(b) crosslinking agents, such as pentaerythritol, glycerol, N,N,N',N'-tetrakis(2-hydroxypropyl)ethylene diamine, and the like;
(c) flame retardants, generally alkyl phosphates or inorganic compounds, such as antimony oxide, and the like;
(d) thermal stabilizers, such as d-tartaric acid, t-butyl catechol and the like;
(e) plasticizers, such as di-octyl phthalate and the like;
(f) fillers, such as scrap shredded foam, wood flour, metal flakes, and the like; and
(g) pigments, such as titania, silica, carbon black, and the like;
(h) dyes, antioxidants, antiozonants, deodorants, fungicides, and the like.

The amounts of the various components employed in the foam formulations of this invention are not narrowly critical.

When water is present as a foaming agent, amounts of water from 0.5 to 5 weight percent based on the total weight of the formulations can be advantageously employed.

The amount of catalyst to be employed in the urethane foam formulations of this invention is well understood by persons skilled in the urethane resin foam art. In general, the total amount of catalyst or mixture of catalysts is from 0.001 percent to 5 percent of the foam formulation.

The amount of the siloxanes of this invention employed as a foam stabilizer in the foam formulations of this invention can vary over wide limits from 0.1 weight percent to 10 weight percent or greater. [Weight percentages are based on the total weight of the foam formulation, that is, the polyether, isocyanate, catalyst, blowing agent, and foam stabilizer.] There is no commensurate advantage to using amounts of foam stabilizer greater than 10 weight percent or less than 0.1 weight percent.

In summary, the organofunctional silicone copolymers of the present invention are useful in preparing flexible, semirigid, rigid, open or closed cell polyetherurethane foams. These foams can be used to prepare such useful articles as carpet underlays, bumpers, pillows, insulation for refrigerators, buoyant elements for boats, and the like.

The following examples are illustrative only of the present invention and are not intended in any way to be limitative thereof.

EXAMPLE 1

Preparation of isocyanatoorganosilicone dimethyl silicone copolymer

Into a reactor was charged 50 grams (0.5 mole) phosgene and 100 ml. of 1,4-chloroethylbenzene. The reactor and contents was cooled and maintained within the range of about −10° C. to about −30° C. during the addition to the reactor of 150 grams of a silicone fluid having the average composition:

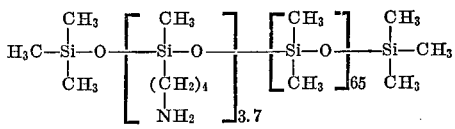

(average molecular weight of about 5300) and having a viscosity of 97 centistokes. The resulting paste-like reaction mixture was then heated to 160–170° C. and additional phosgene was added until a clear reaction mass was obtained. Removal of low boiling materials by nitrogen sparging and vacuum stripping at 200° C. under a reduced pressure of about 1 mm. Hg yielded 134 grams of a somewhat opaque oil having a viscosity of 120 centistokes and an average composition of

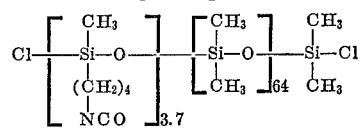

EXAMPLE 2

(A) The effectiveness of isocyanatoorgano silicone dimethylsilicone copolymer as a stabilizer in polyether-polyurethane foam composition is demonstrated by the use thereof in the following formulations:

| | Grams |
|---|---|
| Polyether (LG–56)[1] | 225 |
| Polyether (PPG–2025)[2] | 225 |
| Water | 12 |
| Triethylamine | 0.3 |
| Stannous octoate | 3.0 |
| Silicone isocyanate [3] | 3.75 |
| Toluene diisocyanate [4] | 165.5 |

[1] Polypropylene glycol triol having an average molecular weight of about 3000, an apparent specific gravity (20/20° C.) of 1.009, an average hydroxyl number (mg. KOH/g.) of 56, and an acid number (mg. KOH/g.) of about 0.1.
[2] Having an average molecular weight of from about 1,950 to 2,100, an apparent specific gravity (20/20° C.) of 1.0048, an average hydroxyl number (mg. KOH/g.) of 56, and an acid number (mg. KOH/g.) of about 0.1.
[3] An isocyanatoorganosilicone-dimethylsilicone copolymer having the average structure.

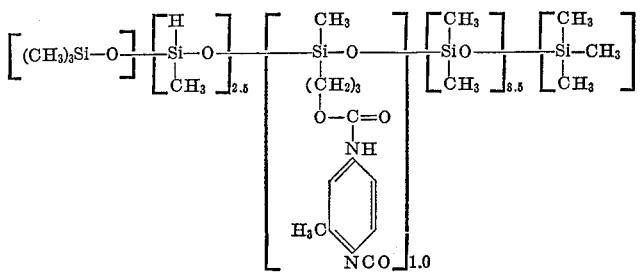

[4] A mixture of about 80 percent of 2,4-toluene diisocyanate and 20 percent 2,6-toluene diisocyanate.

Stannous octoate was added to and thoroughly mixed with a solution of the silicone isocyanate dissolved in the polyether mixture and thereafter combined with a premix of the water and triethyl amine. The resulting mixture was warmed with moderate stirring and when a temperature of 35° C. was attained heating was stopped and vigorous stirring (2000 r.p.m.) continued for 8 seconds. The toluene diisocyanate was quickly added, stirring continued for an additional 7 seconds, and the total composition immediately poured into a waxed paper lined 12 inch square container. The foam mixture rose steadily to fill the box to a height of 6.4 inches, at which point the foam structure stabilized. The foam thus obtained was cured for 15 minutes at 130° C. Examination showed the foam to contain about 30–35 cells per inch with good uniformity.

(B) The procedure of part (A) was repeated twice, using the same materials formulation except that the amount of silicone isocyanate was reduced to one half and one quarter respectively. The resulting foam composition in each case was comparable to that produced in part (A).

EXAMPLE 3

(A) A silicone diisocyanate copolymer composed of the same units as defined in Example 2 but containing these units in different proportions was employed as a foam stabilizer for the formulation of Example 2(A). The silicone diisocyanate had the following structure

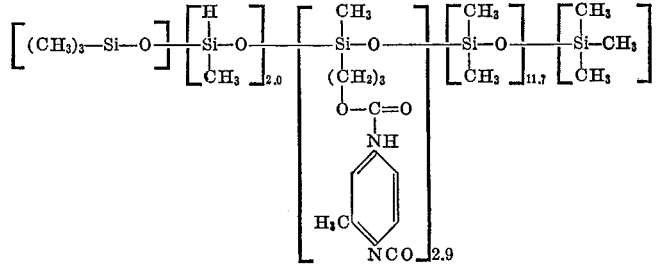

The procedure and formulation of Example 2(A) were duplicated in all respects except for the change in silicone diisocyanate. A stabilized flexible foam attaining a 6.0 inch rise and having 35 to 40 cells per inch was obtained.

(B) In the same manner three additional silicone diisocyanates were substituted for the species employed in Example 2(A). The structures were as follows (a)
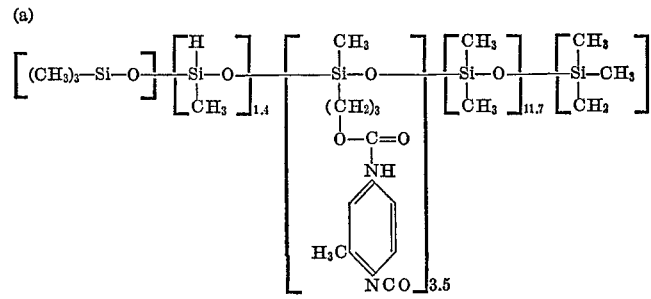

(b)
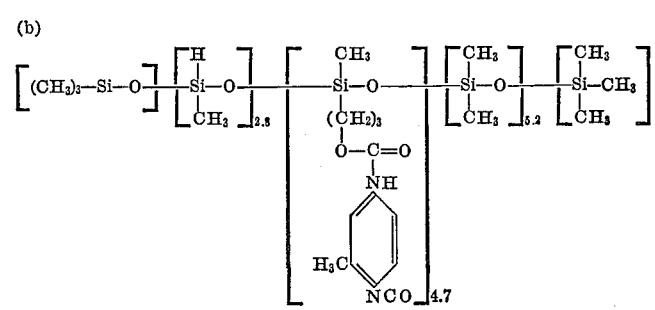

(c)
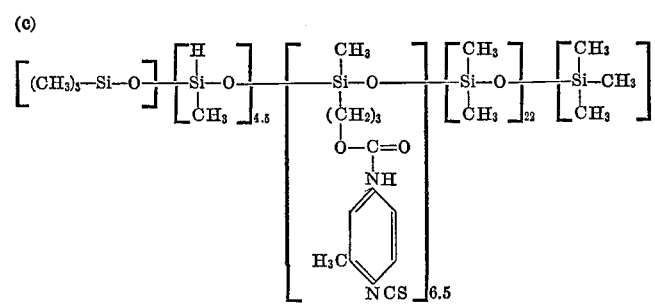

The foam stabilized with silicones (a) (b) and (c) respectively had rises of 8.3, 8.8, and 8.3 inches and 35–40, 40 and 40–45 cells per inch.

EXAMPLE 4

Using the procedures and reaction formulations set forth in Example 2(A) a carboxyorganosilicone and a mercaptoorganosilicone were evaluated as surfactants in polyurethane systems by substitution thereof in equivalent quantities for the isocyanate-containing copolymer employed therein. The mercaptoorganosilicone had the following average structure:

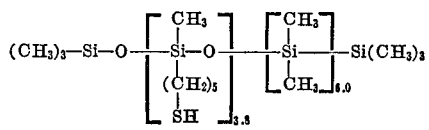

and the carboxyorganosilicone structure was:

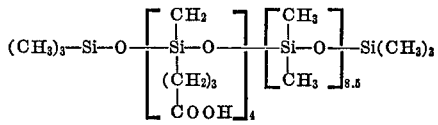

In each instance a flexible foam with good average use and cell count was obtained.

What is claimed is:
1. In the process for preparing a flexible foamed polyurethane plastic which comprises reacting a reaction mixture consisting essentially of: (1) a polyether containing at least two reactive hydrogen atoms as determined by the Zerewitinoff method, said polyether having a molecular weight from 1800 to 5000 and being polyalkylene polyol consisting of one or more chains of connected oxyalkylene radicals which are prepared by the reaction of (a) one or more alkylene oxides with (b) water or a polyol selected from the group consisting of ethylene glycol, propylene glycol, dipropylene glycol, glycerol, trimethylolpropane, 1,2,6-hexanetriol, pentaerythritol, sorbitol, glycosides, sucrose, mononuclear polyhydroxybenzenes, polynuclear hydroxybenzenes, phenol-formaldehyde condensation products, acylic polyamines, mononuclear primary amines and polynuclear polyamines; and (2) an organic polyisocyanate, said polyisocyanate being represented by the general formula:

wherein Y is oxygen, $i$ is an integer of two or more and Q is a hydrocarbon radical having a valence of $i$ in the presence of (3) a blowing agent, (4) a catalyst for the reaction between the isocyanate groups of said polyisocyanate and the reactive hydrogen atoms of said polyether, and (5) a foam stabilizer, the improvement which comprises incorporating in said reaction mixture as the foam stabilizer from 0.1 to 10 weight percent based on the weight of the reaction mixture of at least one organofunctional silicone having the general formula:

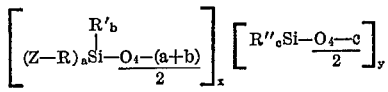

wherein Z is a radical selected from the class consisting of isocyanato and isothiocyanato and is bonded to a carbon atom of R; R is a radical selected from the group consisting of divalent hydrocarbon radicals and divalent organic radicals containing only hydrogen, carbon, nitrogen, and oxygen, the nitrogen and oxygen in the divalent organic radicals represented by R being chemically combined in

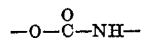

groups, R is bonded to silicon through a carbon atom; R' is a monovalent radical selected from the group consisting of hydrocarbyl and hydrocarbyloxy; R'' is a member selected from the class consisting of hydrogen and R' radicals; $a$ is an integer having a value of from 1 to 2 inclusive; $b$ is an integer having a value of from zero to 2 inclusive; $c$ is an integer having a value of from zero to 3 inclusive; $x$ being a number having a value of from 1 to about 25; $(x+y)$ being a number having a value of from about 5 to about 200 and with the proviso that sufficient $R'_b$ and $R''_c$ are methyl radicals that the organofunctional silicone contain at least 50 mole percent dimethylsilicone units, said reaction occurring simultaneously with the foaming of the polyurethane plastic.

2. The process according to claim 1 wherein the polyether is the reaction product of (a) ethylene oxide, propylene oxide, butylene oxide or mixtures thereof with (b) water or glycerol, the organic polyisocyanate is toluene diisocyanate, Z represents an isocyanato group and the organofunctional silicone stabilizer is present in an amount of from about 0.1 to about 10 weight percent based on the weight of the reaction mixture.

3. The process according to claim 1 wherein the polyether is the reaction product of (a) ethylene oxide, propylene oxide, butylene oxide or mixtures thereof with (b) water or glycerol, the organic polyisocyanate is toluene diisocyanate, Z represents an isothiocyanato group and the organofunctional silicone stabilizer is present in amount of from about 0.1 to about 10 weight percent based on the weight of the reaction mixture.

4. The process according to claim 1 wherein the value of $x$ is from about 2 to about 10, the value of $(x+y)$ is from about 10 to about 15 and the polymer contains from about 2 to about 10 dimethyl silicone units per organofunctional unit.

5. The process of claim 1 wherein $(a+b)$ is 2.

6. The process of claim 1 wherein the silicone has the general formula:

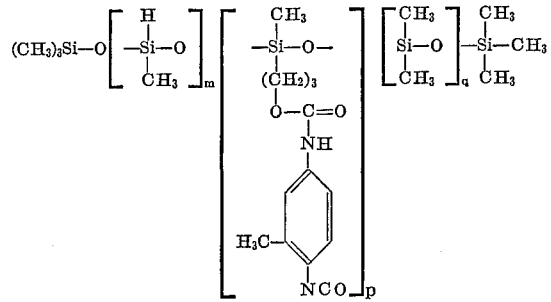

wherein $m$ has a value from 2.0 to 4.5, $p$ has a value from 1.0 to 6.5 and $q$ has a value from 5.2 to 22.

References Cited

UNITED STATES PATENTS

| | | | |
|---|---|---|---|
| 3,170,891 | 2/1965 | Speier | 260—37 |
| 3,179,622 | 4/1965 | Haluska | 260—46.5 |
| 3,246,048 | 4/1966 | Haluska | 260—824 |
| 3,249,586 | 5/1966 | Haluska | 260—46.5 |
| 3,178,391 | 4/1965 | Holtschmidt et al. | 260—77.5 |
| 3,182,076 | 5/1965 | Holdstock | 260—2.5 |
| 3,243,475 | 3/1966 | Reischl et al. | 260—2.5 |
| 3,272,762 | 9/1966 | Ibbotson et al. | 260—2.5 |
| 3,278,465 | 10/1966 | Twitchett et al. | 260—2.5 |

DONALD E. CZAJA, Primary Examiner

H. S. COCKERAM, Assistant Examiner

U.S. Cl. X.R.

260—453, 46.5, 77.5